US012771988B2

(12) United States Patent
Margalit

(10) Patent No.: US 12,771,988 B2
(45) Date of Patent: Oct. 20, 2026

(54) SYSTEM AND METHOD FOR GENERATING AN AUDIO SIGNAL

(71) Applicant: SONICEDGE LTD., Shoham (IL)

(72) Inventor: Mordehai Margalit, Zichron Yaaqov (IL)

(73) Assignee: Sonicedge Ltd., Shoham (IL)

( * ) Notice: Subject to any disclaimer, the term of this patent is extended or adjusted under 35 U.S.C. 154(b) by 218 days.

(21) Appl. No.: 18/228,723

(22) Filed: Aug. 1, 2023

(65) Prior Publication Data

US 2024/0056727 A1 Feb. 15, 2024

Related U.S. Application Data

(60) Provisional application No. 63/396,274, filed on Aug. 9, 2022.

(51) Int. Cl.
*H04R 1/28* (2006.01)
*H04R 17/10* (2006.01)
*H04R 19/02* (2006.01)

(52) U.S. Cl.
CPC ........... *H04R 1/2811* (2013.01); *H04R 17/10* (2013.01); *H04R 19/02* (2013.01); *H04R 2201/003* (2013.01)

(58) Field of Classification Search
CPC ...... H04R 1/2811; H04R 17/10; H04R 19/02; H04R 2201/003
See application file for complete search history.

(56) References Cited

U.S. PATENT DOCUMENTS

| | | | | |
|---|---|---|---|---|
| 7,348,646 | B2 * | 3/2008 | Barzen | H04R 19/005 257/417 |
| 8,861,752 | B2 | 10/2014 | Margalit | |
| 2006/0093170 | A1 * | 5/2006 | Zhe | H04R 31/003 381/396 |
| 2016/0277838 | A1 | 9/2016 | Kuperschmidt et al. | |
| 2016/0277845 | A1 | 9/2016 | Kuperschmidt et al. | |
| 2016/0360320 | A1 | 12/2016 | Margalit | |
| 2016/0360321 | A1 | 12/2016 | Margalit | |
| 2018/0352338 | A1 * | 12/2018 | Murarka | H04R 19/005 |
| 2019/0077654 | A1 * | 3/2019 | Reagan | B81C 1/00301 |
| 2020/0145762 | A1 * | 5/2020 | Singh | G10K 15/04 |

* cited by examiner

*Primary Examiner* — Carolyn R Edwards
*Assistant Examiner* — Dylan Maguire Neece
(74) *Attorney, Agent, or Firm* — Manelli Selter PLLC; Edward Stemberger

(57) ABSTRACT

Techniques described herein generally relate to generating an audio signal with a speaker. In some examples, a speaker device is described that includes a membrane and a shutter and driver device is configured to receive an audio signal, modulate it and generate electric signals to operate the speaker and generate an acoustic audio signal.

7 Claims, 8 Drawing Sheets

SYSTEM AND METHOD FOR GENERATING AN AUDIO SIGNAL

TECHNICAL FIELD

The present disclosure generally relates to systems and methods for generating an audio signal. In some examples the system and methods of generating an audio signal are applied in a mobile, wearable, or portable device. In other examples the system and methods of generating an audio signal are applied in earphones, headsets, hearables, or hearing aids.

BACKGROUND OF THE DISCLOSURE

U.S. Pat. No. 8,861,752 describes a picospeaker which is a novel sound generating device and a method for sound generation. The picospeaker creates an audio signal by generating an ultrasound acoustic beam which is then actively modulated. The resulting modulated ultrasound signal has a lower acoustic frequency sideband which corresponds to the frequency difference between the frequency of the ultrasound acoustic beam and the modulation frequency. US 20160360320 and US 20160360321 describe MEMS architectures for realizing the picospeaker. US 20160277838 describes one method of implementation of the picospeaker using MEMS processing. US 20160277845 describes an alternative method of implementation of the picospeaker using MEMS processing. The extract the optimal performance of the MEMS picospeaker, the device needs to be placed in a package and connected electrically, mechanically and acoustically to the audio device. In this disclosure we describe examples of packaging the MEMS device using the unique features of the modulated ultrasound picospeaker.

GLOSSARY

"acoustic signal"—as used in the current disclosure means a mechanical wave traversing either a gas, liquid or solid medium with any frequency or spectrum portion between 10 Hz and 10,000,000 Hz.

"audio" or "audio spectrum" or "audio signal"—as used in the current disclosure means an acoustic signal or portion of an acoustic signal with a frequency or spectrum portion between 10 Hz and 20,000 Hz.

"speaker" or "pico speaker" or "micro speaker" or "nano speaker"—as used in the current disclosure means a device configured to generate an acoustic signal with at least a portion of the signal in the audio spectrum.

"membrane"—as used in the current disclosure means a flexible structure constrained by at least two points.

"blind"—as used in the current disclosure means a structure with at least one acoustic port through which an acoustic wave traverses with low loss.

"shutter"—as used in the current disclosure means a structure configured to move in reference to the blind and increase the acoustic loss of the acoustic port or ports.

"acoustic medium"—as used in the current disclosure means any of but not limited to; a bounded region in which a material is contained in an enclosed acoustic cavity; an unbounded region where in which a material is characterized by a speed of sound and unbounded in at least one dimension. Examples of acoustic medium include but are not limited to; air; water; ear canal; closed volume around ear; air in free space; air in tube or another acoustic channel.

"active demodulation"—as used in the current disclosure means any of but not limited to frequency shift of an ultrasound acoustic signal by modulation of the acoustic impedance of at least one part of the MEMS speaker.

SUMMARY

Some embodiments of the present disclosure may generally relate to a speaker device that includes at least one ultrasound speaker (USS) and one shutter. The USS is positioned in a first plane and configured to oscillate along a first directional path and at a first frequency effective to generate an ultrasonic acoustic signal. The shutter is positioned in a second plane that is substantially separated from the first plane. The shutter is configured to modulate the ultrasonic acoustic signal such that an audio signal is generated. The speaker device is connected to a driver device where the driver device supplies at least two electrical signals to operate the speaker device at least one membrane and shutter respectively. The driver device receives an input audio signal from which it generates a modulated audio signal to operate the USS and generate an ultrasonic modulated signal. The driver further operates the shutter at the modulation frequency to demodulate the ultrasonic modulated signal and generate an acoustic audio signal.

Other embodiments of the present disclosure may generally relate to a speaker device comprising a plurality of USS and/or shutters. The array of USS and/or shutters operate either independently or in unison by the driver device. In one example, the driving device is a semiconductor integrated circuit which includes; a controller; a charge pump configured to generate a high voltage signal; a switching unit configured to modulate the high voltage signal. The driving device receives a digital sound data stream and an operating voltage and outputs driving signals for the membrane, and shutter. In some embodiments the USS and shutter operate asynchronously and or independently of each other at one or more frequencies. In other embodiments the USS and shutter operate synchronously at the same frequency. In the synchronous mode of operation, the amplitude of the audio signal is controlled by any of but not limited to; the relative phase of the USS and shutter operation; the amplitude of the shutter operation; the amplitude of the USS operation; any combination of these.

In a further embodiment the USS and shutter are realized as a thin film layer stack where on layer is configured as a USS and one or two layers are configured as a shutter. The thin film stack is structured on a perforated Silicon wafer, where at least one perforation is aligned with at least one USS.

In a further embodiment the perforated Silicon wafer includes at least two conductive through Silicon vias with at least one through Silicon via electrically connected to the USS and at least one through Silicon via electrically connected to the shutter.

In a further embodiment a second perforated cap is attached above the thin film layer stack where at least one perforation in the cap is aligned to a shutter or USS.

In an alternative further the perforated cap includes conductive vias connecting the thin film layers to the external side of the cap.

In an alternative embodiment of the present disclosure the speaker device is composed of a stack of at least two ultrasound transducer chip (UTC) each UTC comprised of one or more membranes, wherein the UTC are attached to each other, and electrically connected. At least one of the membranes in a UTC is configured as an USS and at least a second membrane of a UTC is configured as a shutter.

In a further embodiment of the present disclosure the speaker device is composed of a stack of at least two ultrasound transducer chip (UTC) and between the chips a perforated sheet. Each UTC is comprised of one or more membranes. A first UTC is attached to one side of the perforated sheet where at least one membrane in the UTC is aligned with at least one hole of the perforated sheet and a second UTC is attached to the second side of the perforated sheet with at least one membrane aligned to at least one hole in the perforated sheet. The first and second UTC are electrically connected, wherein the electrical connection is configured as either part of the perforated sheet or alternatively an electrical connection utilizes at least one dedicated perforation hole. In a further embodiment at least one of the membranes in a UTC is configured as an USS and at least a second membrane of a UTC is configured as a shutter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION OF EXAMPLE EMBODIMENTS

Figure 1:
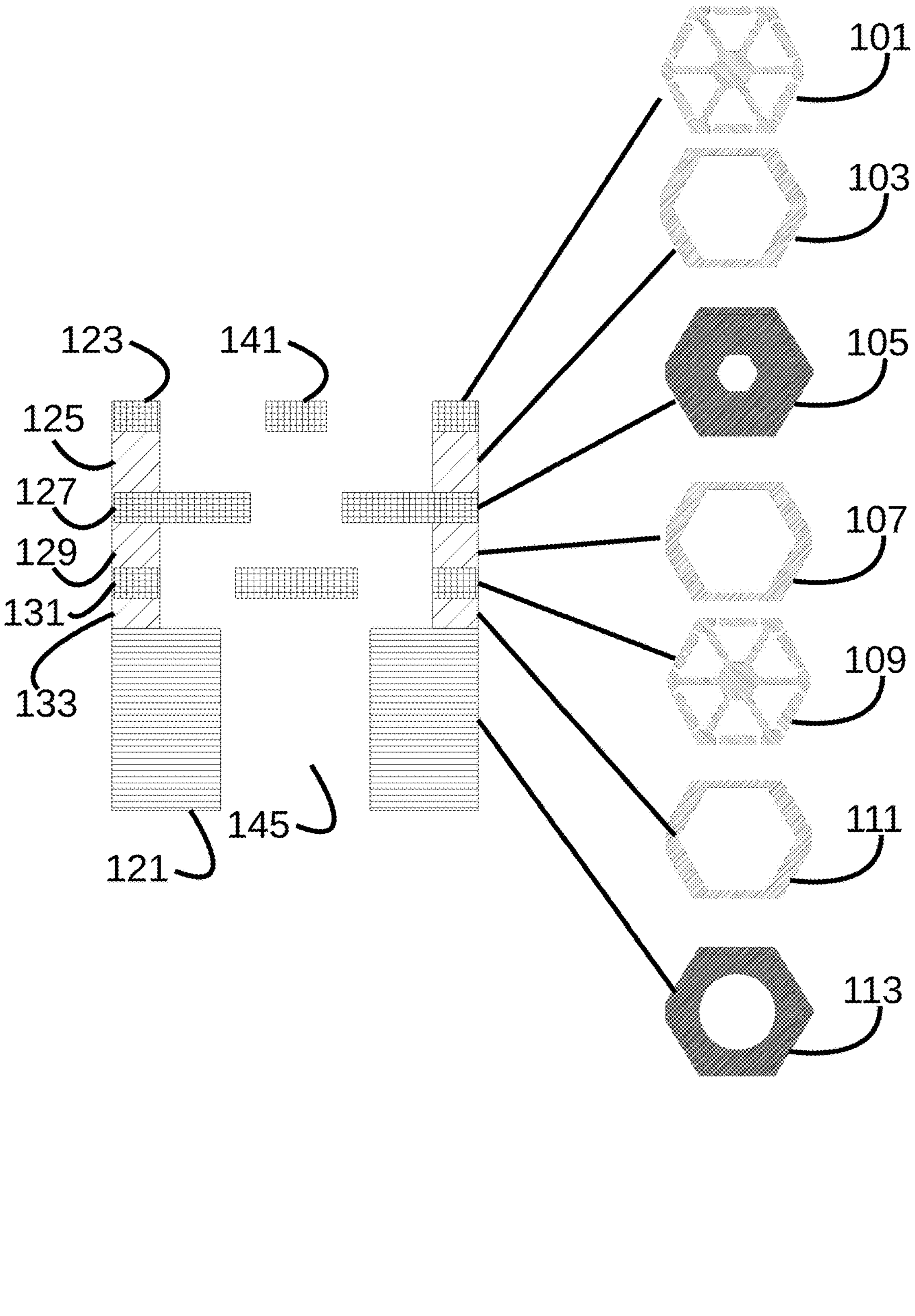
FIG. 1 is an example of layer structure of one combination of an ultrasound speaker and shutter unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure. This disclosure is drawn, inter alia, to methods, apparatus, computer programs, and systems of generating an audio signal.

In some examples, a speaker device is described that includes a membrane and a shutter. The membrane is configured to oscillate along a first directional path and at a combination of frequencies with at least one frequency effective to generate an ultrasonic acoustic signal. A shutter and blind are positioned proximate to the membrane. In one non limiting example the membrane, the blind, and the shutter may be positioned in a substantially parallel orientation with respect to each other. In other examples the membrane, the blind, and the shutter may be positioned in the same plane and the acoustic signal is transmitted along acoustic channels leading from the membrane to the shutter. In a further example the modulator and or shutter are composed of more than one section.

In some embodiments, the membrane is driven by an electric signal that oscillates at a frequency and hence moves at b $\mathrm{Cos}(2\pi^*\Omega t)$, where b is the amplitude of the membrane movement, and t is time. The electric signal is further modulated by a portion that is derived from an audio signal a(t). The acoustic signal generated by the membrane is characterized as:

$$s(t)=b\ a(t)\mathrm{Cos}(2\pi^*\Omega t) \quad (1)$$

Applying a Fourier transform to Equation (1) results in a frequency domain representation $$S(f)=b/2^*[A(f-\Omega)+A(f+\Omega)] \quad (2)$$

Where A(f) is the spectrum of the audio signal. Equation (2) describes a modulated audio signal with an upper and lower side band around a carrier frequency of (Double Side Band-DSB). Applying to the acoustic signal of Equation (1) an acoustic modulator operating at frequency Ω results in $$S(t)=b\ a(t)\mathrm{Cos}(2\pi^*\Omega t)(I+m\ \mathrm{Cos}(2\pi^*\Omega t)) \quad (3)$$

Where I is the loss of the modulator and m is the modulation function and due to energy conservation $I+m<1$. In the frequency domain $$S'(f)=b/4^*[m\ A(f)+m\ A(f+2\Omega)+A(f-\Omega)+A(f+\Omega)] \quad (4)$$

Where b/4*m A(f) is an audio signal. The remaining terms are ultrasound signals where m A(f+2Ω) is at twice the modulation frequency and A(f-Ω)+A(f+Ω) is the original unmodulated signal. Additional acoustic signals may be present due to any but not limited to the following; ultrasound signal from the shutter movement; intermodulation signals due to nonlinearities of the acoustic medium; intermodulation signals due to other sources of nonlinearities including electronic and mechanical.

In one example we use the term "active demodulation" to describe the above functions where a frequency shift of an ultrasound acoustic signal is facilitated by modulation of the acoustic impedance of at least one part of the MEMS speaker.

In one example a speaker device includes at least three electro static active layers or membrane layers; a membrane layer as described in equation (1) which receives a first voltage signal, a shutter or modulator layer as described in equation (3) which receives a second voltage signal and a ground layer. In an alternative example a speaker may include at least two piezo electric active layers; a membrane layer and shutter layer where each layer receives a voltage signal on one side of a membrane and a ground signal on a second side of the membrane.

FIG. 1 is an example of layer structure of one combination of an ultrasound speaker and shutter unit. In one example an ultrasound speaker and shutter unit are comprised of multiple patterned layers. Layer 121 with its corresponding top view 113, is a perforated substrate on which the other layers are deposited or constructed.

Examples of materials for layer 121 include but are not limited to; Silicon, Silicon Oxide or other glass materials, Aluminum Oxide or other ceramic materials, PCB or other organic substrates. Examples of perforations 145 include circular, rectangular, or other shapes, with angled walls at angle between 70° to 120° and preferably between 80° to 100°. A perforation 145 can be defined in the substrate prior to layer deposition, or after layer deposition using any off but not limited to; dry etching, wet etching, EDM, laser drill, mechanical drill or combination of these methods. The perforation 145 provides an acoustic aperture traversing from a bottom side of layer 121 to a top side of layer 121. Layer 133 with its corresponding top view 111 is a first spacer layer providing an anchor for the membrane of layer 131. Layer 131 with its corresponding top view 109, are a first membrane layer. In one example layer 131 is configured to be an ultrasound speaker and designed to have a mechanical resonance frequency higher than the resonance frequency of a membrane configured in layer 123 which will comprise the shutter functionality. In an alternative example layer 131 is configured as a shutter and has a lower resonance frequency than a membrane realized in layer 123. Layer 129 with its corresponding top view 107 is a second spacer layer. Layer 125 with its corresponding top view 103 is a third spacer layer. Layer 127 with its corresponding top view 105 is a second membrane layer configured as part of an acoustic modulator. Layers 131 and 123 functionality can be interchanged depending on the relative resonance frequency. A membrane configured to be a shutter will have a lower resonance frequency than the ultrasound speaker. In a further example, a shutter and layer 127 are configured as an acoustic modulator and referenced as an acoustic modulator. The relative vertical movement of the shutter in reference to layer 127 generates sound by constricting an acoustic channel between layer 127 and the shutter and modulating the ultrasound signal of the ultrasound speaker. The order of the assembly of the layers (131, 127, 123) can be interchanged for example (127, 131, 123) or (131, 123, 127) or any other combination. Shutter and ultrasound speaker can be interchanged in assembly order and location in layer stack. A shutter is defined as the layer with lower mechanical resonance and the ultrasound speaker as the layer with the higher resonance frequency. In one example one or more of the membrane layers (131, 127, 123) is configured for electrostatic actuation and a voltage difference is applied between two membrane pairs (131 and 127, 127 and 123). Examples of voltages include but are not limited to 20 Volt, 30 Volt, 40 Volt, larger than 40 Volt. In an alternative example one or more of the membranes (131, 123) is configured for piezo actuation. The membrane is configured with a bottom electrode, a top electrode and voltage is applied between top and bottom electrode. In the following figures the description is focused on the electrostatic implementation but a piezo electric implementation is applicable by additional parallel electrical connections realized using the techniques and architecture described below. Examples of materials for membranes include but are not limited to; metal layers including Aluminum, Nickel, AlSiCu, AlCu; dielectric layers including SiN, SiO2; polySi, Silicon, piezo electric layers including, PZT, AlN, AlScN, KNN.

Figure 2:
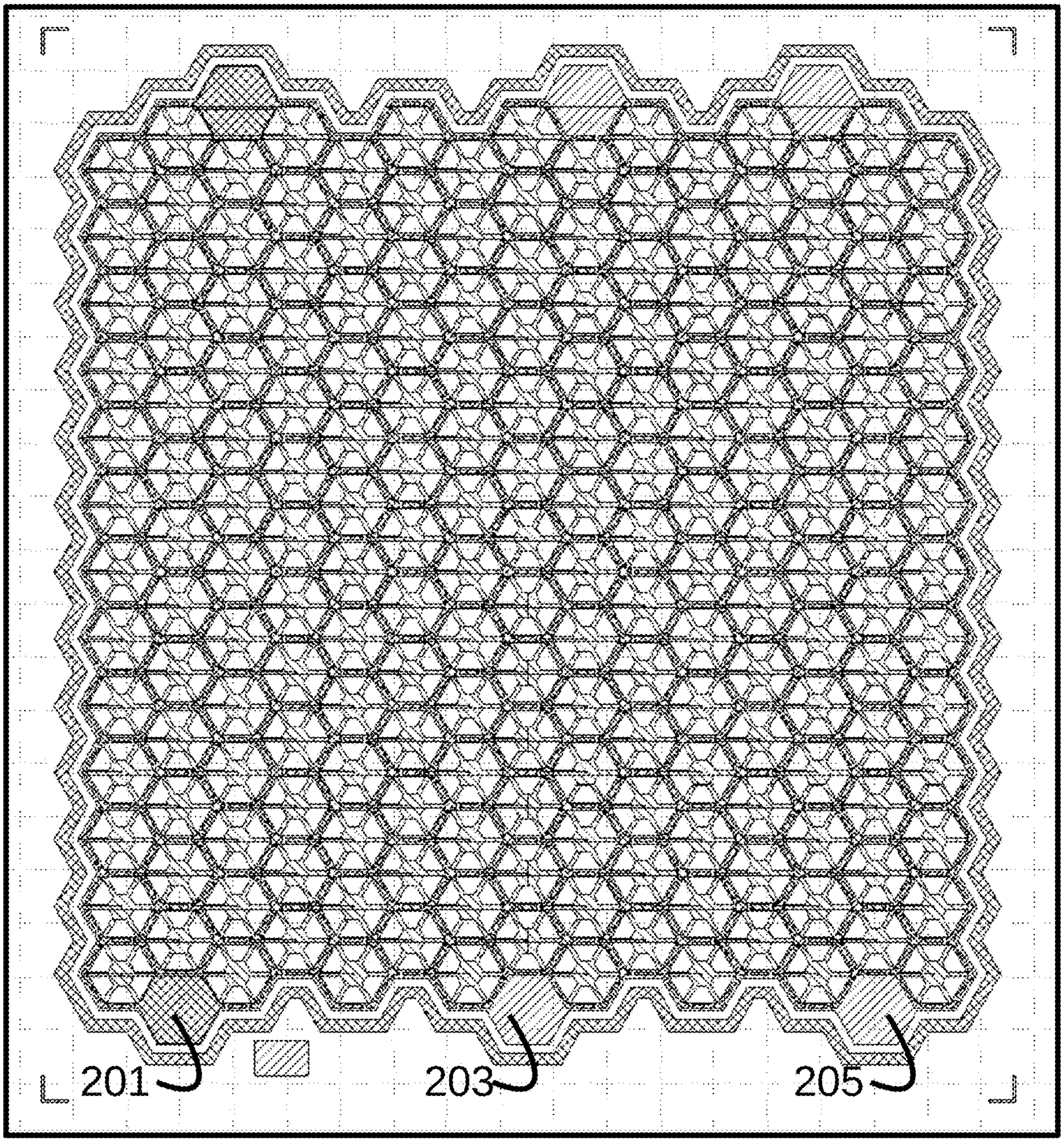
FIG. 2 is an example of a top view of a sound from ultrasound transducer chip composed of a plurality of ultrasound speaker and shutter units.

FIG. 2 is an example of a top view of a sound from ultrasound transducer chip composed of a plurality of ultrasound speaker and shutter units. Electrical pads (201, 203, 205) provide electrical connection to the respective layers (131, 127, 123 in FIG. 1). In one example an ultrasound transducer chip is attached to a laminate or substrate and wire bonds are connected to the electrical pads (201, 203, 205) providing electrical connection for operating the ultrasound transducer chip.

Figure 3:
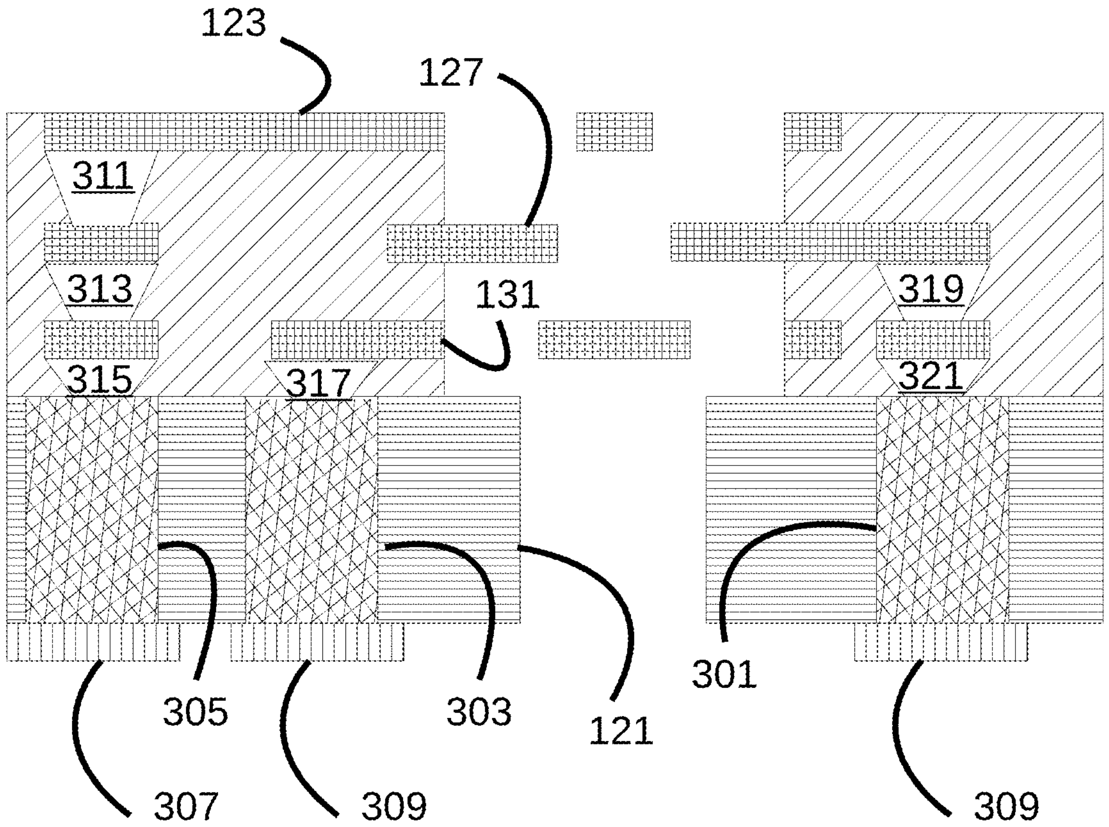
FIG. 3 is an example of an electrical connection for a layer structure of one combination of an ultrasound speaker and shutter unit.

FIG. 3 is an example of an electrical connection for a layer structure of one combination of an ultrasound speaker and shutter unit. In one example a perforated substrate 121 includes conducting structures or vias (301, 303, 305), providing an electrical connection from one side of a substrate to second side of a substrate while being electrically isolated from the substrate. Examples of vias include but are not limited to through silicon vias (TSV) from semiconductor industry or copper vias from PCB and substrate industry. One side of substrate a via (301, 303, 305) is electrically connected to a pad or under bump metallization (UBM). In a further example, UBM is used as pad for electrical connection of device to a PCB or substrate. Examples of materials for UBM include but are not limited to Al, Cu, Ni, Ti, Ch, Au, Ag or composition of these materials. The second side of the via is electrically connected to a membrane layer (123, 127, 131) with cross layer vias (311, 313, 315, 317, 319, 321). In one example layer 123 is connected with a via 311 to an electrically isolated island in layer 127, which is connected with a via 313 to an electrically isolated island in layer 131 and further connected with a via 315 to substrate via 305. Hence pad 307 is electrically connected to layer 123. In a similar manner layer 127 is electrically connected to pad 309 and layer 131 is electrically connected to pad 309. All layers 123, 127, 131 are electrically isolated from each either. In a further example one or more of layers 123, 127, 131 is a piezo electric material with a top and bottom electrode. The structure described previously is extended to provide an additional via in layers and via in substrate to provide a pad and electrical connection to both the piezo material layer top and bottom electrode. In a further example if both 123 and 131 are configured as piezo electric layers a sound from ultrasound chip includes at least 3 pads with a joint ground membrane for both layers, or at least 4 pads with an electrically isolated ground pad for each piezo electric layer.

Figure 4:
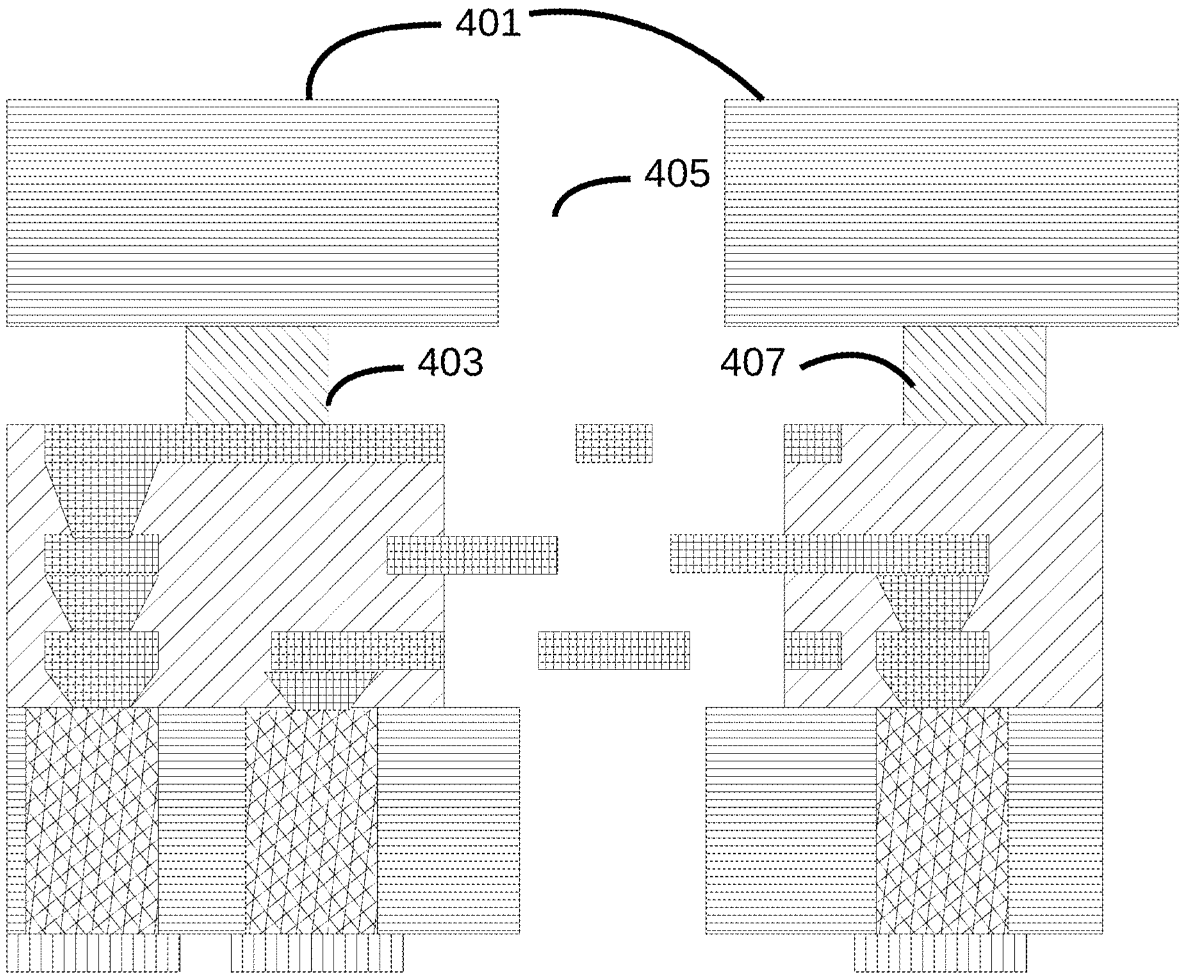
FIG. 4 is an example of an encapsulation configured for chip scale package for a layer structure of one combination of an ultrasound speaker and shutter unit.

FIG. 4 is an example of a perforated encapsulation configured for chip scale package for a layer structure of one combination of an ultrasound speaker and shutter unit. In one example a top substrate (401) is configured with a plurality of acoustic channels (405) located above a shutter or membrane. Examples of top substrates (401) include but are not limited to Silicon, polymer, PCB, laminate, Ceramic, nickel, Aluminum, glass or combinations of these materials. A top substrate (401) is either conductive or dielectric. If a top perforated substrate is conductive, the mechanical connection (403, 407) to the device is configured to maintain electrical isolation of the membrane layers. In one example a mechanical connection (403, 407) is an adhesive including but not limited to epoxy, Silicone, thermoplastic adhesive, polymer adhesive. In an alternative example a mechanical connection (403, 407) is a metal bonding to electrically isolated islands in a membrane layer. Examples of metal bonding include but are not limited to Au, In, Cu, Ag, Sn, Ti, Cr or composition of these metals for eutectic, transient liquid phase, or thermal bonding.

Figure 5:
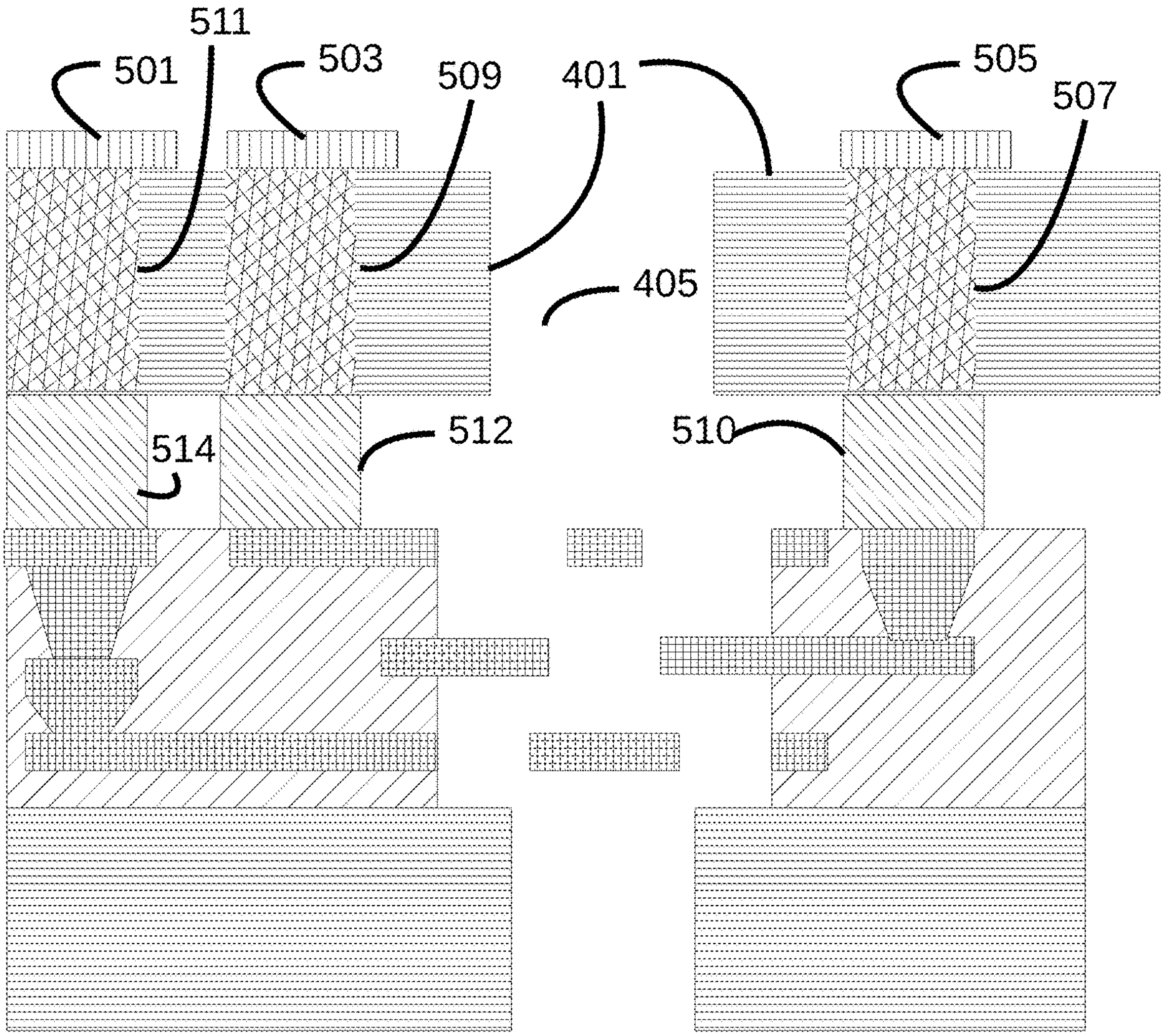
FIG. 5 is an alternative example of an encapsulation configured for chip scale package for a layer structure of one combination of an ultrasound speaker and shutter unit.

FIG. 5 is an alternative example of a perforated encapsulation substrate configured for chip scale package for a layer structure of one combination of an ultrasound speaker and shutter unit where the perforated encapsulation substrate includes electrically conducting vias and the electrical connection to the membrane layers is facilitated from the perforated encapsulation substrate. The perforations of encapsulation substrate (401) provide an acoustic channel (405). Perforated encapsulation substrate (401) further includes a plurality of perforated encapsulation substrate electrical vias (507, 509, 511). Plurality of perforated encapsulation substrate electrical vias (507, 509, 511) are electrically connected on one side of perforated encapsulation substrate (401) to UBM pads (501, 503, 505) and electrically isolated from each other. On second side of perforated encapsulation substrate (401) encapsulation electrical vias (507, 509, 511) are connected (510, 512, 514) with metal bonds or conductive adhesive bond to pads in top membrane layer. The pads in top membrane layer are either electrically connected to top membrane layer or electrically isolated from top membrane layer and connected with vias to bottom membrane layers. Examples of metal bonds include but are not limited to Au, In, Cu, Ag, Sn, Ti, Cr or composition of these metals for eutectic, transient liquid phase, or thermal bonding. Examples of adhesive bonding include but are not limited to silver paste or metal embedded epoxy. Metal or adhesive bond is applied from either substrate or encapsulation or both. The structure described previously is extended to provide an additional via in layers and via in substrate to provide a pad and electrical connection to both the piezo material layer top and bottom electrode. In a further example if both 123 and 131 are configured as piezo electric layers a sound from ultrasound chip includes at least 3 pads with a joint ground membrane for both layers, or at least 4 pads with an electrically isolated ground pad for each piezo electric layer.

Figure 6:
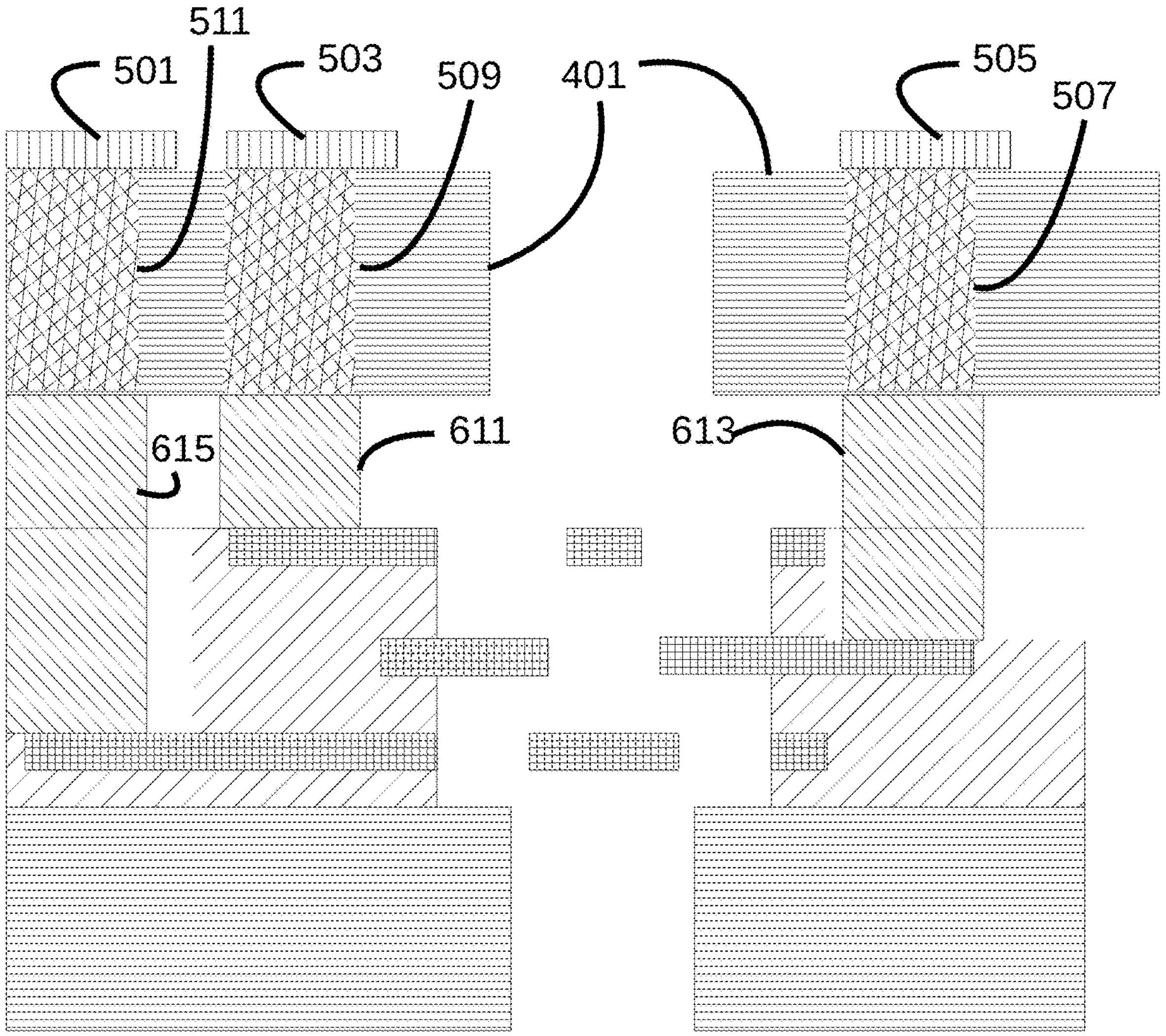
FIG. 6 is a further alternative example of an encapsulation configured for chip scale package for a layer structure of one combination of an ultrasound speaker and shutter unit.

FIG. 6 is a further alternative example of an encapsulation configured for chip scale package for a layer structure of one combination of an ultrasound speaker and shutter unit. In FIG. 6, bond pads in sound from ultrasound chip are exposed at varying heights according to the manufacturing of the membrane layers as described previously in FIG. 1 and FIG. 2. To accommodate the different heights a bond structure (611, 613, 615) provides electrical connection of encapsulation vias (507, 509, 511) to bond pads. Bond structure (611, 613, 615) is configured as a deformable material, accommodating height variations with thickness deformation. In one example bond structure (611, 613, 615) is comprised of Cu pillars with a certain thickness. Pushing Cu pillar against pad results in an increase in thickness of Cu as function of vertical deformation. In an alternative example bond structure (611, 613, 615) is comprised of a eutectic bond material such as AuSn. When applying temperature and pressure the eutectic material melts and the surface tension maintains an optimal thickness as function of bond pad height. In an alternative example where bond structure (611, 613, 615) is comprised of conducting epoxy or polymer, the surface tension will maintain an optimal height to thickness ratio. In one example bond structure (611, 613, 615) initial thickness is more than but not limited to 10 micron; 20 micron; 50 micron; 100 micron; 300 micron.

Figure 7:
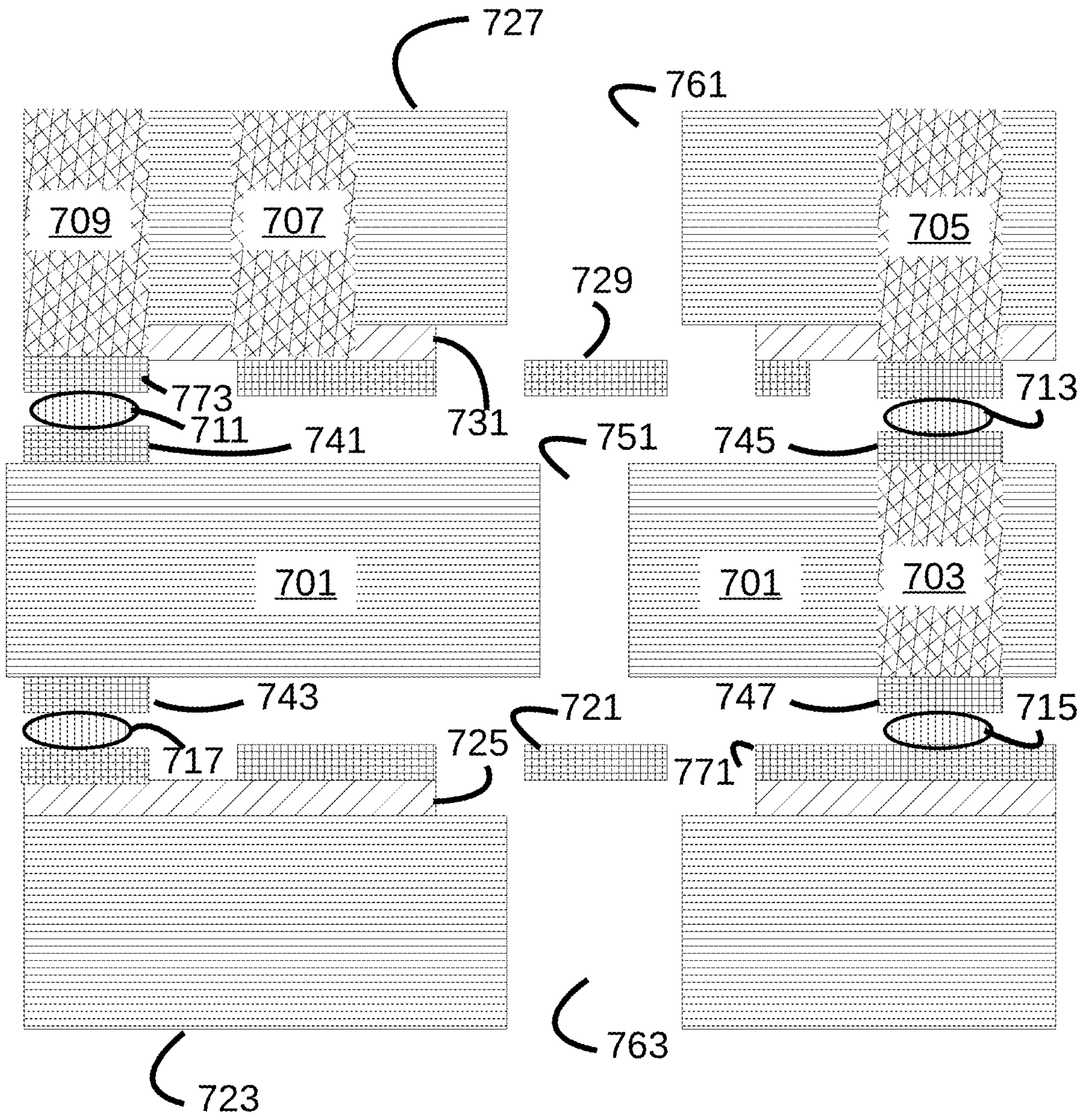
FIG. 7 is an alternative example of a sound from ultrasound layer structure.

FIG. 7 is an alternative example of a sound from ultrasound transducer layer structure comprised of two membrane devices attached to a middle interposer layer. A first membrane device is comprised of a substrate (723), spacer layer (725) and membrane layer (721). A second membrane device is comprised of substrate (727), spacer layer (731) and membrane layer (729). At least one membrane device includes conductive vias (709, 707, 705) configured to provide an electrical connection from one side the membrane device to a second side of the membrane device. An interposer comprised of an interposer substrate (701), interposer pads (741, 743, 745, 747) and containing a plurality of acoustic channels (751) configured at the membrane locations. In a further example the interposer further includes an interposer via (703) providing electrical connection between one side of the interposer and electrically connected to interposer pad (745) to second side and electrically connected to interposer pad (747). Construction of the sound from ultrasound transducer is comprised of; attaching interposer to first membrane device with bond material (717, 715); attaching second membrane device to interposer and first membrane device with bond material (711, 713). In a further example at least part of the bond material is electrically conducting (715, 713) to provide electrical connection from one membrane device to second membrane device. Examples of bond material includes but are not limited to eutectic materials such as AuSn; adhesive bond material such as epoxy, Silicone, or thermoplastic material; Cu; Ag; In. The structure described can be readily extended where the devices are manufactured in a semiconductor wafer or PCB panel and the attachment is done at the wafer or panel level. Separation of the devices is done after attachment.

Figure 8:
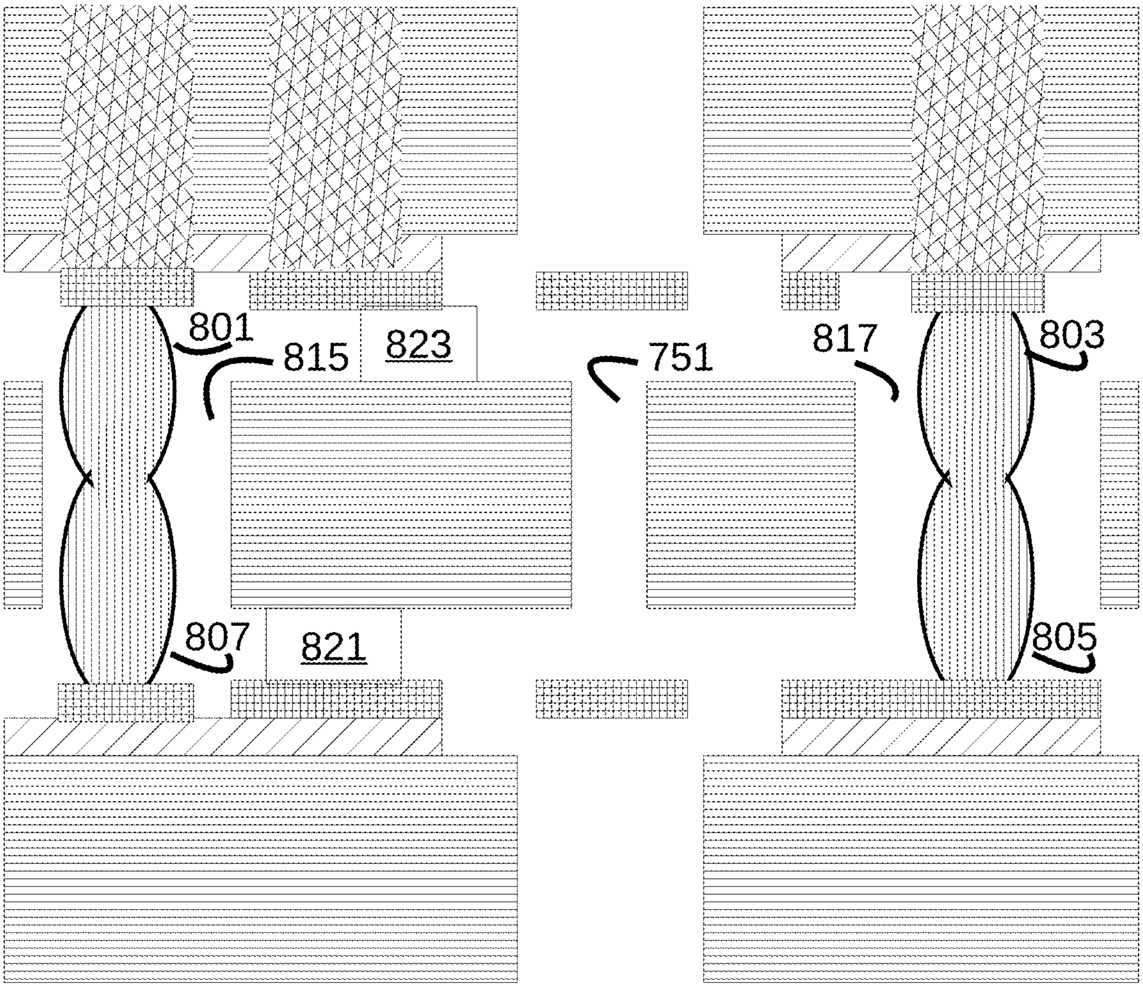
FIG. 8 is an alternative example of a sound from ultrasound layer structure.

FIG. 8 is an alternative example of a sound from ultrasound layer structure where the interposer via is replaced with an aperture (815, 817) in the interposer. The aperture (815, 817) is configured to accommodate a bonding structure extending from first membrane device to second membrane device. Further structures or pads (821, 823) on either the interposer device or membrane device provide accurate distance of membrane device from interposer device. In a further example pads (821, 823) aid in assembly or attachment. In one example a bonding structure is deposited on one membrane device either during fabrication or after fabrication or after assembly of interposer. A bonding structure includes but is not limited to a solder ball; solder; eutectic material; Ag; Au; Cu; adhesive; conductive adhesive; silver paste or epoxy. In a further example a bonding structure is comprised of at least two parts (801 and 807, 803 and 805) where one part is deposited on one membrane device and second part is deposited on second membrane device and assembly of second membrane device on top of interposer and first membrane devices includes a bonding step where two parts of bond structure are united to provide an electrical connection between first membrane device and second membrane device. The structure described can be readily extended where the devices are manufactured in a semiconductor wafer or PCB panel and the attachment is done at the wafer or panel level. Separation of the devices is done after attachment.

To sum, we described in one example an audio transducer comprised of a perforated substrate configured with a first side including at least one ultrasound speaker; and at least one acoustic modulator; wherein the acoustic signal generated from the ultrasound speaker is modulated by the acoustic modulator to generate an audio signal; and wherein the substrate includes at least one electrical via providing an electrical connection from the substrate second side to substrate first side. At least one substrate perforation, at least one ultrasound speaker and at least one acoustic modulator are aligned. In a further example at least one electrical via is configured to provide electrical connection from an acoustic modulator or ultrasound speaker on perforated substrate first side and to an electrical pad located at the perforated substrate second side. In an alternative further example at least one perforation of encapsulation substrate, at least one substrate perforation, at least one ultrasound speaker and at least one acoustic modulator are aligned.

In an alternative example an audio transducer comprised of a perforated substrate configured with a first side including at least one ultrasound speaker; and at least one acoustic modulator; wherein the acoustic signal generated from the ultrasound speaker is modulated by the acoustic modulator to generate an audio signal; a perforated encapsulation substrate in contact with one side of the perforated substrate; and wherein the perforated encapsulation substrate includes at least one electrical via providing an electrical connection from the encapsulation substrate second side to encapsulation substrate first side. A further example where at least one substrate perforation, at least one encapsulation substrate perforation, at least one ultrasound speaker and at least one acoustic modulator are aligned. In a further example at least one encapsulation substrate electrical via is configured to provide electrical connection from an acoustic modulator or ultrasound speaker on perforated encapsulation substrate first side and to an electrical pad located at the perforated encapsulation substrate second side.

In an alternative example and with reference to FIG. 7, an audio transducer comprised of a first perforated substrate (727) configured with a first side including at least one membrane (729), a second perforated substrate (723) configured with a first side including at least one membrane (721), a perforated spacer wafer (701) located in contact on first side with a first perforated substrate (727) and on a second side with a second perforated substrate (723) and wherein at least one membrane (729) is configured as an ultrasound speaker and at least one membrane (721) in cooperation with the perforated spacer wafer (701) as an acoustic modulator to generate sound. In a further example at least one perforation (761) of first perforated substrate (727), at least one perforation (763) of second perforated substrate (723), at least one membrane (729) and at least one perforation (751) of spacer (701) wafer are aligned. In an alternative further example the first perforated substrate (727) includes at least one electrical via (709) configured to electrically connect a membrane (729) located on one side of the first perforated substrate (727) to an electric pad (773) on second side of the first perforated substrate (727) and a second electrical via (705) configured to electrically connect a membrane (721) located on one side of the second perforated substrate (723), thought the perforated spacer wafer (703) to an electric pad (771) on second side of the first perforated substrate. In a further example bond balls or bond material (713, 715, 717, 711) are used to connect either mechanically and or electrically the first, second or spacer perforated wafer to each other.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.". Speaker and picospeaker are interchangeable and can be used in in place of the other.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An audio transducer comprising:

a perforated substrate configured with a first side including at least one ultrasound speaker;

at least one acoustic modulator; wherein an acoustic signal generated from the ultrasound speaker is modulated by the acoustic modulator to generate an audio signal, at least one first electrical via providing an electrical connection from a second side of the perforated substrate, through the perforated substrate, and to the first side thereof;

at least one second electrical via connecting the at least one speaker to the at least one first electrical via;

at least one third electrical via connecting the at least one acoustic modulator to an isolated portion of the at least one speaker; and an electrical pad connected to the first electrical via at the second side of the perforated substrate, such that the at least one acoustic modulator is electrically connected to the electrical pad.

2. The audio transducer of claim 1, wherein at least one perforated substrate perforation, at least one ultrasound speaker and at least one acoustic modulator are aligned.

3. The audio transducer of claim 1, further comprising a perforated encapsulation substrate wherein at least one perforation of the perforated encapsulation is aligned.

4. The audio transducer of claim 1, further comprising a perforated encapsulation substrate wherein at least one encapsulation substrate, at least one substrate perforation, at least one ultrasound speaker and at least one acoustic modulator are aligned.

5. An audio transducer comprising:

a perforated substrate configured with a first side including at least one ultrasound speaker;

at least one acoustic modulator, wherein an acoustic signal generated from the ultrasound speaker is modulated by the acoustic modulator to generate an audio signal; and a perforated encapsulation substrate in contact with one side of the perforated substrate and defining an acoustic channel, wherein the perforated encapsulation substrate includes at least one electrical via providing an electrical connection from the encapsulation substrate second side, through the encapsulation substrate, and to the encapsulation substrate first side, wherein the at least one encapsulation substrate electrical via is configured to provide electrical connection from the acoustic modulator or the ultrasound speaker on the perforated encapsulation substrate first side and to an electrical pad located at a second side of the perforated encapsulation substrate.

6. The audio transducer of claim 5, wherein at least one substrate perforation, at least one encapsulation substrate perforation, at least one ultrasound speaker and at least one acoustic modulator are aligned.

7. An audio transducer comprising:

a first perforated substrate configured with a first side including at least one membrane;

a second perforated substrate configured with a first side including at least another membrane;

a perforated spacer wafer located in contact on first side with the first perforated substrate and on a second side with the second perforated substrate and wherein the at least one membrane is configured as an ultrasound speaker and the at least another membrane in cooperation with the perforated spacer wafer is configured as an acoustic modulator to generate sound, wherein at least one perforation of first perforated substrate, at least one perforation of second perforated substrate, at least one membrane and at least one perforation of spacer wafer are aligned, wherein the first perforated substrate includes at least one electrical via configured to electrically connect a membrane located on one side of the first perforated substrate to an electric pad on second side of the first perforated substrate and a second electrical via configured to electrically connect a membrane located on one side of the second perforated substrate, through the perforated spacer wafer to an electric pad on second side of the first perforated substrate.

* * * * *